United States Patent [19]
Carroll

[11] Patent Number: 5,640,312
[45] Date of Patent: Jun. 17, 1997

[54] ISOLATED POWER SUPPLY HAVING POWER SWITCH ON SECONDARY SIDE

[75] Inventor: Barry N. Carroll, The Woodlands, Tex.

[73] Assignee: Compaq Computer Corporation, Houston, Tex.

[21] Appl. No.: 527,765

[22] Filed: Sep. 13, 1995

[51] Int. Cl.$^6$ ............................................. H02M 3/335
[52] U.S. Cl. .................... 363/21; 363/97; 323/902
[58] Field of Search ........................ 363/18–21, 89, 363/95, 97, 131; 323/902

[56] References Cited

U.S. PATENT DOCUMENTS

| | | | |
|---|---|---|---|
| 4,460,951 | 7/1984 | Fenter et al. | 363/49 |
| 4,649,464 | 3/1987 | Shono | 363/21 |
| 4,825,350 | 4/1989 | Brackman, Jr. | 363/56 |
| 5,499,184 | 3/1996 | Squibb | 363/100 |

FOREIGN PATENT DOCUMENTS

| | | | |
|---|---|---|---|
| 52-73621 | 6/1977 | Japan | 363/21 |

*Primary Examiner*—Peter S. Wong
*Assistant Examiner*—Adolf Berhane
*Attorney, Agent, or Firm*—Robert Groover; Betty Formby; Matthew Anderson

[57] ABSTRACT

A power supply for a computer system having at least one energy demanding component. The power supply includes a transformer having a primary side coupled to an AC main and a secondary side coupled to an output line, a charging circuit coupled between the secondary side of the transformer and the output line, an optical switch coupled to the secondary side of the transformer and comprised of an optical transmitter and an optical receiver, a secondary side power switch coupled to the optical receiver, a pulse width modulator coupled to an output of the optical receiver and a transformer switch coupled to an output of the pulse width modulator. The pulse width modulator generates a pulse sequence which alternates between first and second states, each having respective durations and frequencies. At each change between the first and second states, the transformer switch selectively connects or disconnects the primary side of the transformer with the input line. By changing the frequency and duration for which the transformer switch selectively connects or disconnects the primary side of the transformer, the charging circuit will have sufficient charge to power the energy demanding components when the power switch is in the first position, sufficient charge to power the switching system when the power switch is in the second position, but insufficient charge to operate the energy demanding components when the power switch is in the second position.

34 Claims, 5 Drawing Sheets

5,640,312

ISOLATED POWER SUPPLY HAVING POWER SWITCH ON SECONDARY SIDE

CROSS REFERENCE TO RELATED APPLICATION

This application is related to co-pending U.S. patent application Ser. No. 08/527,764 (Atty. Docket No. CMPQ-0720), entitled "Personal Computer Power Supply having Secondary Side Protection Circuit", filed on even date herewith, assigned to the Assignee of the present application and hereby incorporated by reference as if reproduced in its entirety.

BACKGROUND OF THE INVENTION

1. Field of the Invention

The present invention generally relates to a power supply for a personal computer and, more particularly, to a power supply for a personal computer having a power switch located on a secondary side thereof.

2. Description of Related Art

The power supply for a computer system, for example, a personal computer (or "PC") converts alternating current (or "AC") power, typically from an AC input line, most commonly, a 120 volt AC main, to direct current (or "DC") power suitable for use by the various energy-demanding components of the PC. Accordingly, conventional power supplies typically include a transformer having a primary side connected to the AC input line and a secondary side connected to a DC output line. The transformer converts the AC voltage to a value which will, when rectified and filtered, provide the desire DC voltage. Accordingly, one or more rectifiers, for example a full-wave rectifying circuit, and a filter consisting of inductance in series and capacitance in shunt with the DC output line are typically provided between the secondary side of the transformer and the DC output line. Typically, the various energy-demanding components of the PC will require voltage at different levels, most commonly, ±12 volts, ±5 volts and +3.3 volts. Accordingly, power supplies are also provided with appropriate voltage dividing circuitry as well.

Conventional power supplies are further equipped with a power switch used to make or break an electrical connection with the AC input line. As the primary purpose of the power switch has been to enable the selective disconnection and reconnection of the PC with the AC input line, the power switch for the power supply has been traditionally located on the primary side. Prior designs of power supplies have avoided placing the power switch on the secondary side of the power supply, most likely for the reason that, while such a secondary side power switch would successfully disconnect the various energy-demanding devices of the PC, the power supply itself would continue to draw power from the AC input line, thereby resulting in both unnecessary consumption of electrical power and increased wear on the power supply. Furthermore, as the "powered-down" PC would still be electrically connected to the AC input line, there would be a greater likelihood that the PC would pose a safety hazard.

However, while it has been traditionally preferred that power supplies are designed such that the power switch is placed on the primary side thereof, such a placement is not without its own drawbacks. If placed on the low voltage, secondary side of the power supply, the power switch would be a relatively inexpensive item. However, when placed on the high voltage, primary side of the power supply, the cost of the power switch increases dramatically. For example, a power switch placed on the primary side of the power supply must be rated for 120 volts. Furthermore, various governmental regulatory agencies, particularly in Europe, have very strict requirements for components located across a high voltage AC line. Thus, the power switch must be designed to comply with various regulations intended to increase the safety of the switch.

It can be readily seen from the foregoing that it would be desirable to place a power switch on the secondary side of the power supply which is capable of disconnecting the primary side of the transformer from the AC input line, thereby providing a power supply having a safe and inexpensive power switch. It is, therefore, an object of the present invention to provide such a power supply.

BRIEF SUMMARY OF THE INVENTION

In one embodiment, the present invention is of a unique power supply and an associated computer system having at least one energy demanding component requiring a first DC voltage for operation thereof. An input line couples the power supply with an AC main while an output line couples the power supply with the energy demanding components of the computer system. The power supply includes a transformer having a primary side coupled to the input line and a secondary side coupled to the output line and a switching system which incorporates a secondary side power switch movable between first and second positions. The input of the switching system is coupled to the secondary side of the transformer to receive a second, lower, DC voltage while the output of the switching system is coupled to the primary side of the transformer. The output of the switching system intermittently connects the primary side of the transformer to the input line at a first frequency when the power switch is in the first position and at a second frequency when the power switch is in the second position. The secondary side of the transformer provides sufficient DC voltage to operate the energy demanding components when the power switch is in the first position and the primary side of said transformer is intermittently connected to the input line at the first frequency while providing sufficient DC voltage to operate the switching system but insufficient DC voltage to operate the energy demanding components when the power switch is in the second position and the primary side of the transformer is intermittently connected to the input line at the second frequency.

In one aspect thereof, the power supply further includes a charging circuit coupled between the secondary side of the transformer, the switching system and the output line. The charging circuit charges whenever the primary side of the transformer is connected to the input line and will have sufficient charge to power the energy demanding components when the power switch is in the first position, sufficient charge to power the switching system when the power switch is in the second position, but insufficient charge to operate the energy demanding components when the power switch is in the second position.

In another aspect thereof, the switching system is comprised of first and second portions respectively coupled to the primary and secondary sides of the transformer. The first portion of the switching system transmits a signal to the second portion of the switching system in response to the power switch being moved between the first and second positions. In response to the signal received from the second portion of the switching system, the first portion of the switching system will intermittently connect the primary side of the transformer to the input line at either the first frequency or the second frequency.

In an alternate aspect thereof, the switching system includes an optical switch coupled to the secondary side of the transformer and a transformer switching circuit. The optical switch is coupled to the secondary side of the transformer to receive the second DC voltage and is comprised of an optical transmitter coupled to the power switch and an optical receiver. The transformer switching circuit is coupled to the optical receiver and the primary side of the transformer. The optical transmitter transmits a signal to the optical receiver in response to the power switch being moved between the first and second positions. In response thereto, the transformer switching circuit intermittently connects the primary side of the transformer with the input line at the first frequency if the signal indicates that the power switch has been moved from the second position to the first position and intermittently connecting the primary side of the transformer with the input line at the second frequency if the signal indicates that the power switch has been moved from the first position to the second position.

In a further aspect thereof, the transformer switching circuit is comprised of a pulse width modulator and a transformer switch. The pulse width modulator has a first input coupled to an output of the optical receiver and an output coupled to an input of the transformer switch. The pulse width modulator outputs a pulse sequence which alternates between first and second states at either the first frequency or the second frequency. At each change between the first and second states, the transformer switch selectively connects or disconnects the primary side of the transformer with the input line. The first state of the pulse sequence has a first duration when the pulse sequence alternates between the first and second states at the first frequency and a second duration when the pulse sequence alternates between the first and second states at the second frequency. For example, the first frequency may be about 50 KHz and the second frequency may be about 330 Hz. When the pulse sequence alternates at the first frequency, the first duration may be about 9 μsec. Conversely, when the pulse sequence alternates at the second frequency, the first duration may be about 3.3 nanosecond.

In another embodiment, the present invention is of a power supply for a computer system having at least one energy demanding component requiring a first DC voltage for operation thereof. An input line couples the power supply with an AC main while an output line couples the power supply with the energy demanding components. The power supply includes a transformer having a primary side coupled to the input line and a secondary side coupled to the output line, a voltage regulation system and a transformer switching circuit. The voltage regulation system is comprised of a DC voltage measurement circuit coupled to the secondary side of the transformer, an optical transmitter coupled to the voltage measurement circuit and an optical receiver. The transformer switching circuit has an input coupled to the optical receiver and an output which provides the first DC voltage at the secondary side of the transformer by intermittently connecting, at a first frequency, the primary side of the transformer with the input line for a time period having a duration. Upon the optical transmitter's issuance of a level signal indicative of a variance between a measured DC voltage and the first DC voltage, the transformer switching circuit adjusts the duration of the time period during which the primary side of the transformer is connected to the input line.

In one aspect thereof, the transformer switching circuit further includes a pulse width modulator and a transformer switch. The pulse width modulator has a first input coupled to an output of the optical receiver and an output coupled to an input of the transformer switch. The pulse width modulator selectively issues, at its output, a pulse sequence which alternates between a first state having the aforementioned duration and a second state and adjusts the duration of the first state if the signal indicates that the measured DC voltage has varied from the first DC voltage. The transformer switch selectively connects or disconnects the primary side of the transformer from the input line at each change between the first and second states. Thus, by adjusting the duration of the connection between the primary side of the transformer and the input line, the DC voltage at the second side of the transformer is adjusted.

In another embodiment, the present invention is of a power supply for a computer system having at least one energy demanding component requiring a first DC voltage for operation thereof. An input line couples the power supply with an AC main while an output line couples the power supply with the energy demanding components. The power supply includes a transformer having a primary side coupled to the input line and a secondary side coupled to the output line, a charging circuit coupled between the secondary side of the transformer and the output line, an optical switch coupled to the secondary side of the transformer and comprised of an optical transmitter and an optical receiver, a secondary side power switch coupled to the optical receiver, a pulse width modulator coupled to an output of the optical receiver and a transformer switch coupled to an output of the pulse width modulator. The pulse width modulator outputs a pulse sequence which alternates between first and second states at either the first frequency or the second frequency. At each change between the first and second states, the transformer switch selectively connects or disconnects the primary side of the transformer with the input line. The first state of the pulse sequence has a first duration when the pulse sequence alternates between the first and second states at the first frequency and a second duration when the pulse sequence alternates between the first and second states at the second frequency.

The optical transmitter transmits a signal to the optical receiver in response to the power switch being moved between the first and second positions. In response thereto, the pulse width modulator will change the frequency of the pulse sequence to the first frequency if the signal indicates that the power switch has been moved from the second position to the first position and to the second frequency if the signal indicates that the power switch has been moved from the first position to the second position. In turn, the frequency and duration at which the transformer switch selectively connects or disconnects the primary side of the transformer with the input line at each changes. As the charging circuit charges whenever the primary side of the transformer is connected to the input line, the charging circuit will have sufficient charge to power the energy demanding components when the power switch is in the first position, sufficient charge to power the switching system when the power switch is in the second position, but insufficient charge to operate the energy demanding components when the power switch is in the second position. Preferably the first state of the pulse sequence has a first duration when the pulse sequence alternates between the first and second states at the first frequency and a second duration when the pulse sequence alternates between the first and second states at the second frequency.

In one aspect thereof, the power supply further includes a voltage regulation system comprised of a DC voltage measurement circuit coupled to the charging circuit, a second optical transmitter coupled to the voltage measurement circuit and a second optical receiver coupled to the pulse width modulator. In response to the optical transmitter issuing a level signal indicative of a variance between a measured DC voltage and the first DC voltage, the pulse width modulator adjusts the duration of the first state of the output pulse. As the transformer switch selectively connects or disconnects the primary side of the transformer from the input line at each change between the first and second states, by adjusting the duration of the connection between the primary side of the transformer and the input line, the DC voltage at the second side of the transformer is adjusted.

BRIEF DESCRIPTION OF THE DRAWING

The invention may be better understood, and its numerous objects and advantages will become apparent to those skilled in the art, by reference to the following drawing in which.

DETAILED DESCRIPTION

Figure 1:
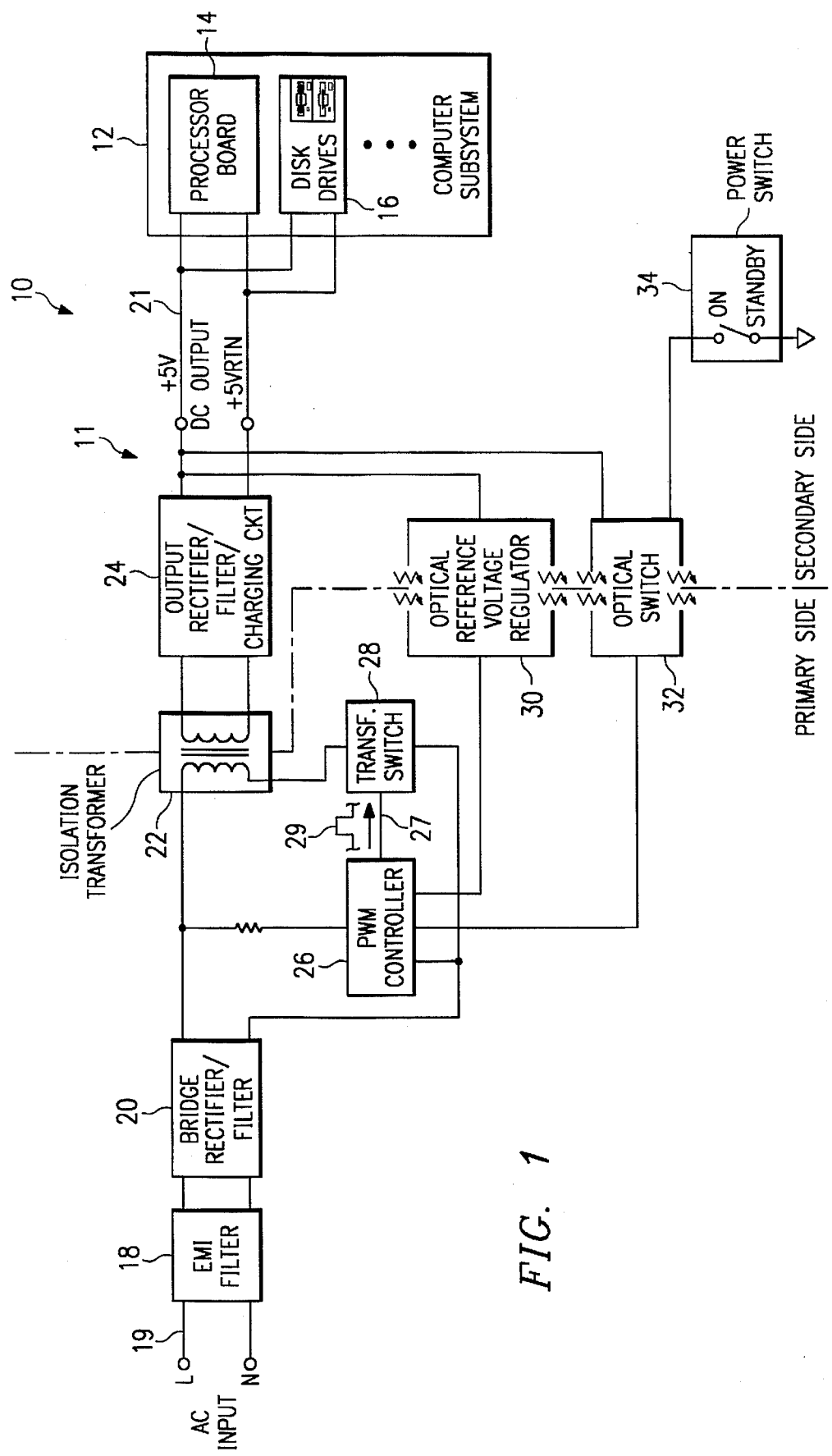
FIG. 1 is a block diagram of a computer system and an associated power supply having a power switch positioned on a secondary side thereof and constructed in accordance with the teachings of the present invention.

Referring now to the drawing where like reference numerals designate the same or similar elements throughout the several views, in FIG. 1, a computer system, for example, a PC 10, having a power supply 11 having a power switch provided on a secondary side thereof and constructed in accordance with the teachings of the present invention will now be described in greater detail. In the foregoing description, the term "primary side" refers to that portion of the power supply 11 which is located between an AC input line 19 which supplies AC power provided by an AC main (not shown) to the power supply 11 and an AC side of an isolation transformer 22 while the term "secondary side" refers to that portion of the power supply 11 which is located between a DC side of the isolation transformer 22 and a DC output line 21 which provides DC power to energy-demanding electrical components coupled thereto.

Thus, as illustrated in FIG. 1, the power supply 11 includes a primary side coupled by an AC input line 19 to an AC power source, for example, an AC main, for receiving high voltage, for example, 120 VAC, power and a secondary side coupled to various energy-demanding components of a computer subsystem 12 for supplying low voltage, for example, 5 VDC, power thereto. It should be noted that for ease of illustration, a single, +5 volt, DC output line 21 and a corresponding, +5 volt, DC return line is shown in FIG. 1. However, it is fully contemplated that the power supply 11 include plural DC output lines, for example, +3.3 volt and +12 volt lines, each providing a separate DC voltage, for connection with the selected ones of the energy demanding components which comprise the computer subsystem 12.

Furthermore, while FIG. 1 illustrates a processor board 14 and disk drives 16 as the energy demanding components of the computer subsystem 12 which are coupled to the DC output line 21 of the power supply 11, it is further contemplated that additional energy demanding components (not shown in FIG. 1) of the computer subsystem 12, as well as other energy demanding components of the PC 10 which are not part of the computer subsystem 12, may be coupled to the DC output line 21 of the power supply 11 to receive low voltage DC power therefrom.

The power supply 11 includes an electromagnetic interference (or "EMI") filter 18, coupled to the AC input line 19, for removing high frequency noise generated by the power supply 11. Generally speaking, the EMI filter 18 is comprised of a combination of inductive and capacitative elements. The capacitative elements of the EMI filter 18 form an attenuation circuit which short circuits high frequency noise across the AC lines while the inductive elements of the EMI filter 18 provide both a common mode choke for filtering noise common to both lines and a differential mode choke for filtering differential noise, i.e., noise flowing in one line in a positive fashion and flowing out the other line in a negative fashion.

Coupled to the output of the EMI filter 18 is a bridge rectifier/filter circuit 20. The bridge rectifier circuit 20 provides full wave rectification of the input AC power supplied thereto in which, for each half of the AC wave, a positive half-wave peak is output. From the bridge rectifier/filter circuit 20, the output of the bridge rectifier circuit 20 is provided to the primary side of the isolation transformer 22 where the rectified AC power undergoes a 120:6 step down.

The secondary side of the isolation transformer 22 is coupled to an output rectifier/filter/charging circuit 24 where the rectified, stepped down AC power output the second side of the isolation transformer 22 is converted into a low voltage DC power. Finally, the output of the output rectifier/filter/charging circuit 24 is connected to the various energy demanding components, for example, the processor board 14 and disk drives 16 of the computer subsystem 12, for the supply of DC power thereto. More specifically, the output rectifier/filter/charging circuit 24 further includes capacitative elements which store power which may be drawn upon by the energy demanding components 14, 16.

Also located on the secondary side of the power supply 11 are an optical reference voltage regulator 30, an optical switch 32 and a secondary side power switch 34. The secondary side power switch is a conventionally designed, low voltage switch movable between a first, or "ON", position in which the power supply 11 delivers electrical power to the energy demanding components 14, 16 of the computer subsystem and a second, or "STANDBY", position in which the power supply 11 delivers electrical power to the optical reference voltage regulator 30 and the optical switch 32 but not to the energy demanding components 14, 16. While the physical construction of the power switch 32 is of conventional design, it should be clearly understood that power supplies have traditionally utilized power switches rated for 120 VAC and that the use of a low voltage, i.e., 12 VDC, power switch to control operation of a power supply for a computer system has, heretofore, been unknown.

Both the optical reference voltage regulator 30 and the optical switch 32 include an optical transmitter which generates an optical signal, for example, using an LED, and an optical receiver which detects the optical signal generated by the optical transmitter. The optical reference voltage regulator 30 is an analog device in which the optical transmitter continuously generates an optical signal of varying intensity and the optical receiver measures the intensity of the optical signal. The optical switch 32, on the other hand, is a digital device in which the optical transmitter generates an optical signal for discrete time periods and the optical receiver detects the presence or absence of the optical signal.

Returning momentarily to the primary side of the isolation transformer 22, the power supply 11 also includes a current mode pulse width modulator (or "PWM") controller 26, for example, a UC1842 controller manufactured by Unitrode, for controlling the supply of power to the primary side of the isolation transformer 22 in two manners—by controlling the selective connection and/or disconnection of the AC input line 19 from the primary side of the isolation transformer 22 to effect transitions between the ON and STANDBY modes and by adjusting the time period during which the AC input line 19 are connected to the primary side of the isolation transformer 22 to regulate voltage levels on the secondary side of the isolation transformer 22.

More specifically, the PWM controller 26 includes an output line 27 connected to transformer switch 28 such that, when the output line 27 goes high, the transformer switch 28 closes to electrically connect the AC input line 19 with the isolation transformer 22 such that the isolation transformer 22 may conduct power between the primary and secondary sides thereof. If, however, the output line 27 goes low, the transformer switch 28 opens to electrically disconnect turns off and the isolation transformer 22 is disconnected from the AC input line 19 such that the isolation transformer 22 no longer receives power from the AC input line 19.

The PWM controller 26 operates by generating a square wave output 29 along output line 27 to the transformer switch 28. The transformer switch 28 connects the AC input line 19 with the primary side of the isolation transformer 22 when the OUT line of the PWM controller 26 is high and disconnects the AC input line 19 from the primary side of the isolation transformer 22 when the OUT line of the PWM controller 26 is low. For example, during normal operations, i.e., when the secondary side power switch is in the ON position, a square wave pulse sequence which alternates between a first, or "one", state and a second, or "zero" state at a frequency of 50 KHz and is shaped such that each positive pulse of the first state has a duration on the order of about 9 μsec will connect the AC input line 19 to the primary side of the isolation transformer 22 for an appropriate time period such that sufficient charge will build on the secondary side of the isolation transformer 22 to power the energy demanding components 14, 16. For ease of later referral thereto, the aforedescribed pulse sequence, when output by the PWM modulator 26, will hereafter be referred to as the "PULSE" output.

By shortening the duration and frequency of the pulse sequence generated by the PWM controller 26, the amount of charge which will build on the secondary side of the isolation transformer 22 is sufficient to power the optical switch 32, but insufficient to power either the optical reference voltage regulator 30 or the energy demanding components 14, 16 of the computer subsystem 12. For example, a square wave pulse sequence which alternates between the first and second states at a frequency of 330 Hz and is shaped such that each positive pulse of the first state has a duration on the order of about 3.3 nanoseconds will connect the AC input line 19 to the primary side of the isolation transformer 22 for an appropriate time period such that sufficient charge is built on the secondary side of the isolation transformer 22 to power the optical switch 32 but insufficient charge is built to power either the optical reference voltage regulator 30 or the energy demanding components 14, 16 of the computer subsystem 12. For ease of later referral thereto, the aforedescribed pulse sequence, when output by the PWM modulator 26, will hereafter be referred to as the "SPIKE" output.

Thus, the PWM controller 26 enables the power supply 11 to perform several functions. First, the PWM controller 26 allows the power switch 34 to be placed on the secondary side of the power supply 11. In the past, the drawback to placing the power switch 34 on the secondary side or other location where the power switch lacks a direct connection with the power source is that, once powered down, the switch may be unable to re-energize the device. The PWM controller 26 avoids this problem by providing sufficient power to the secondary side of the power supply 11 such that, while there is insufficient voltage to power the energy demanding devices 14, 16 of the computer subsystem 12, the optical switch 32 remains powered.

Specifically, when the secondary side power switch is in the ON position, the transmitter portion of the optical switch 32 is inactive, i.e., the LED is dark. In the absence of such a signal, the PWM controller 26 generates the PULSE output having the aforementioned frequency and duration characteristics which will connect the primary side of the isolation transformer 22 with the AC input line 19 such that sufficient charge will build on the secondary side of the isolation transformer 22 to power the energy demanding devices 14, 16. When the secondary side power switch is moved into the STANDBY position, the transmitter portion of the optical switch 32 issues a signal by illuminating the LED. Illumination of the LED is detected by the optical receiver and a signal transmitted to the PWM controller 26. Upon detection of the signal, the PWM controller 26 modifies its output to the SPIKE output having the aforementioned frequency and duration characteristics which will connect the primary side of the isolation transformer 22 with the AC input line 19 such that sufficient charge will build on the secondary side of the isolation transformer 22 to power the optical switch 32 but insufficient charge will build to power either the optical reference voltage regulator 30 or the energy demanding devices 14, 16.

Later, when the secondary side power switch 34 is returned to the ON position, the LED goes dark, thereby terminating the signal to the PWM controller 26. In response to the loss of signal, the PWM controller modifies its output signal to return to the original PULSE output. In turn, the transformer switch will again connect the primary side of the isolation transformer 22 to the AC input line 19 for a period of time which will allow sufficient charge to build on the secondary side of the isolation transformer 22 to power the energy demanding components 14, 16 of the computer subsystem 12.

The PWM controller 26 also provides voltage regulation for the DC output lines of the power supply 11. A variance in the measured load voltage along one of these output lines is indicative of either a decrease in the line voltage being supplied to the primary side of the isolation transformer 22 or an increased load drawing down the secondary side of the isolation transformer 22.

To detect such variances, the power supply 11 includes optical reference voltage regulator 30 coupled to the +5 V DC output line 21. The optical reference voltage regulator 30 is an analog device in which the optical transmitter continuously generates an optical signal of varying intensity and the optical receiver measures the intensity of the optical signal. The optical transmitter of the optical reference voltage regulator 30 continuously generates a light beam having a selected intensity to the optical receiver which, in turn, transmits the signal to the PWM controller. If the PWM controller 26 determines that the light beam has the selected intensity, it concludes that there is no variance in the load voltage along the +5 V DC output line 21 and will maintain the frequency and duration characteristics of the PULSE output. If the intensity of the beam is greater or less than the selected intensity, the PWM controller 26 will determine that a variance in the load voltage has occurred. To compensate for the detected variance, the PWM controller will selectively shorten or lengthen the duration of the pulse transmitted to the transformer switch 28 to adjust the period during which the primary side of the isolation transformer 22 is connected to the AC input line 19 such that the charge developed on the secondary side of the isolation transformer 22 returns to the proper load voltages. The extent to which the PWM controller adjusts the duration characteristic of the pulse sequence 29 will vary depending on the extent of the detected load variance. For example, if the load on the secondary side of the isolation transformer is halved, the duration of the pulse sequence 29 would be shortened to about 4.5 μsec.

The DC output line 21 only requires voltage regulation when the secondary side power switch 34 is in the ON position and DC voltage is being supplied to the energy demanding components 14, 16. Regulation is not required when the secondary side power switch 34 is in the STANDBY position and DC voltage is not being supplied to the energy demanding components 14, 16. Thus, as will be more fully described below, the optical reference voltage regulator 30 is only powered when the power switch is in the ON position.

Referring collectively to FIGS. 2A–E, a schematic of the power supply 11 may now be seen and, in conjunction with this schematic, the operation of certain components of the power supply 11 which enable the power supply to perform the aforementioned operations will now be described in greater detail. As may now be seen more clearly, rather than providing a single DC power level as illustrated in FIG. 1, the secondary side of the power supply 11 is configured to provide DC power for the energy demanding components of the computer subsystem 12 at various levels, including the +12, +5 and +3.3 volt levels.

Figure 2A:
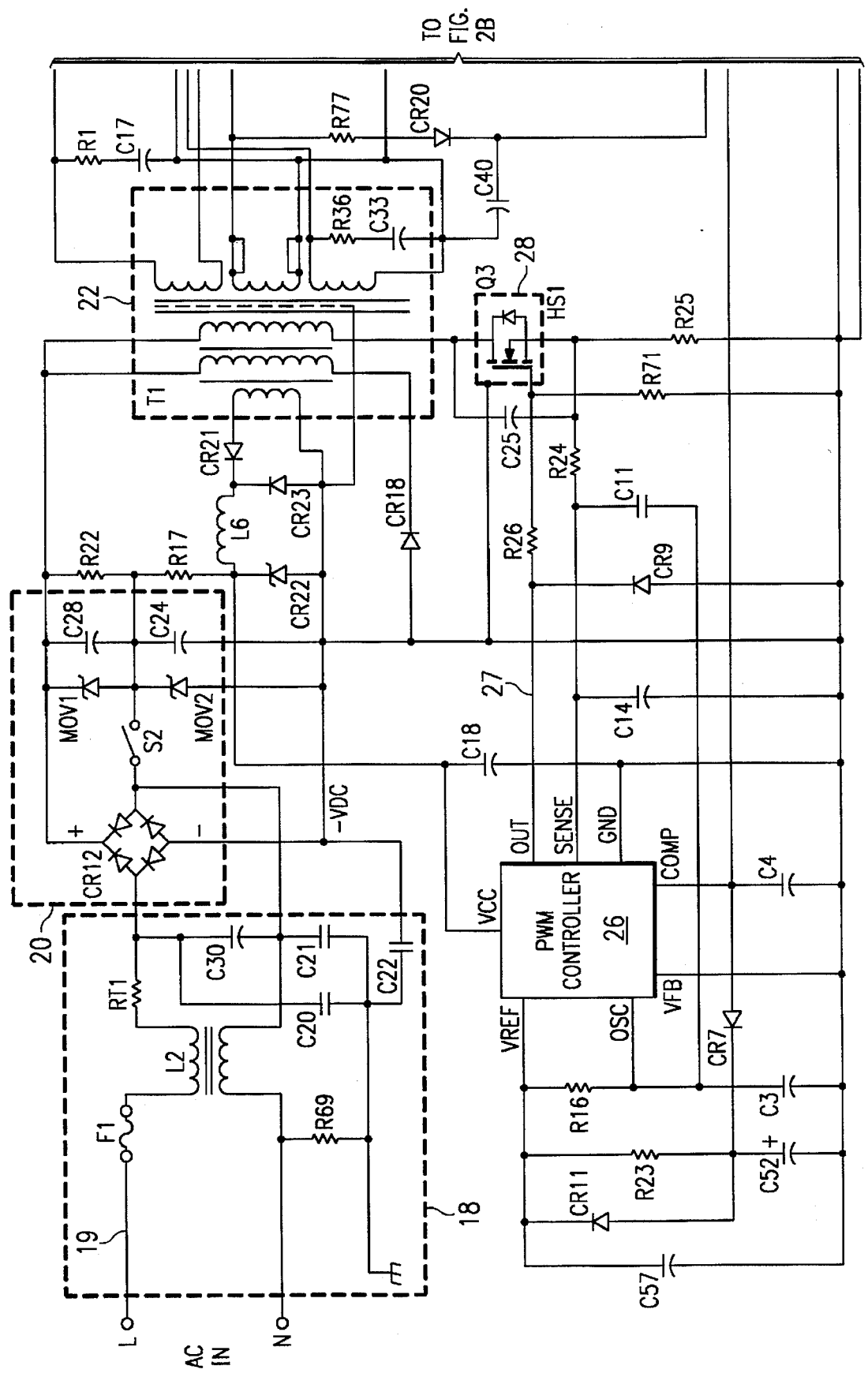
FIG. 2A is a circuit diagram of a primary side and a first portion of the secondary side of the power supply of FIG. 1.
Figure 2B:
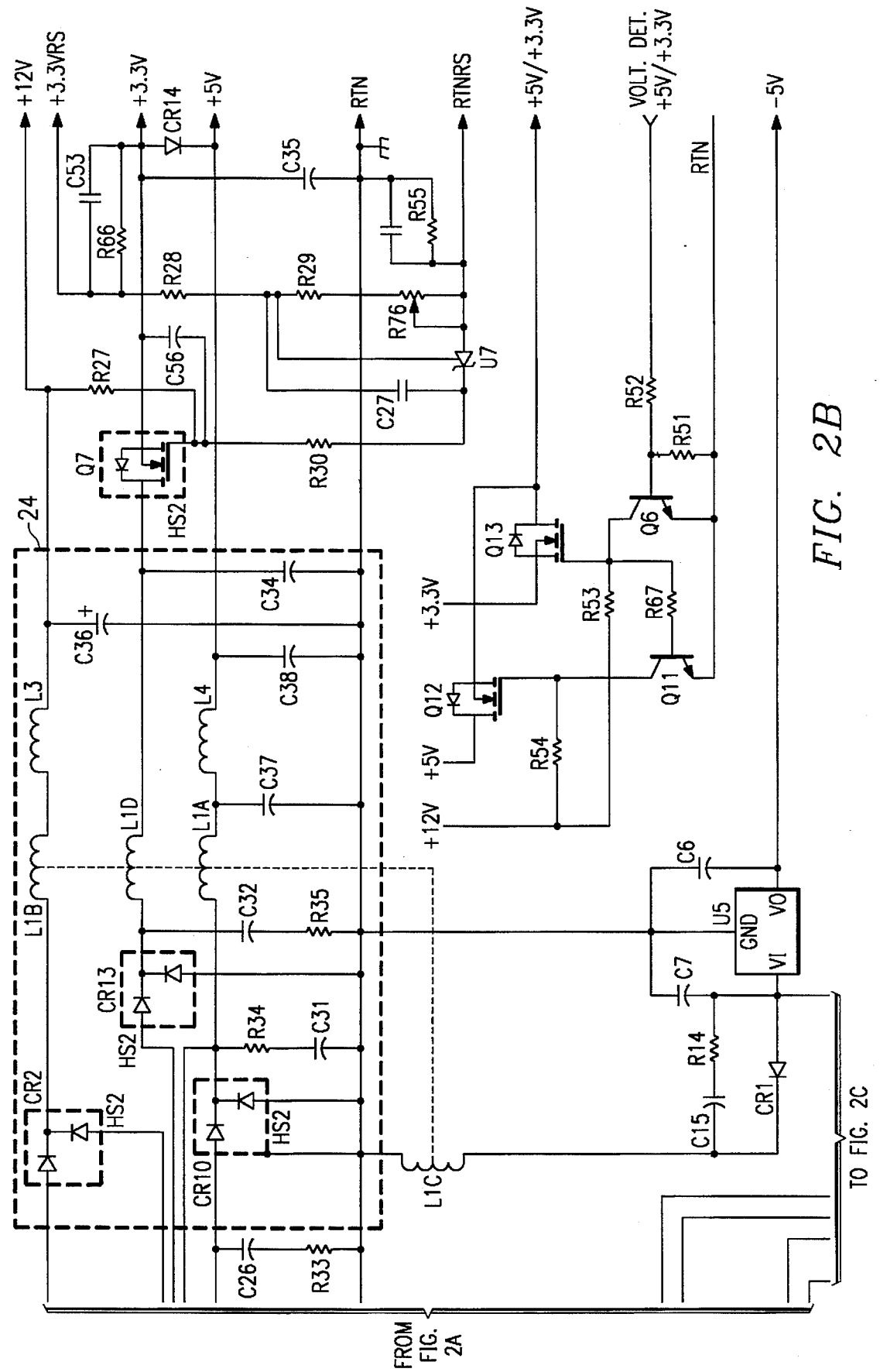
FIG. 2B is a circuit diagram of a second portion of the secondary side of the power supply of FIG. 1.
Figure 2C:
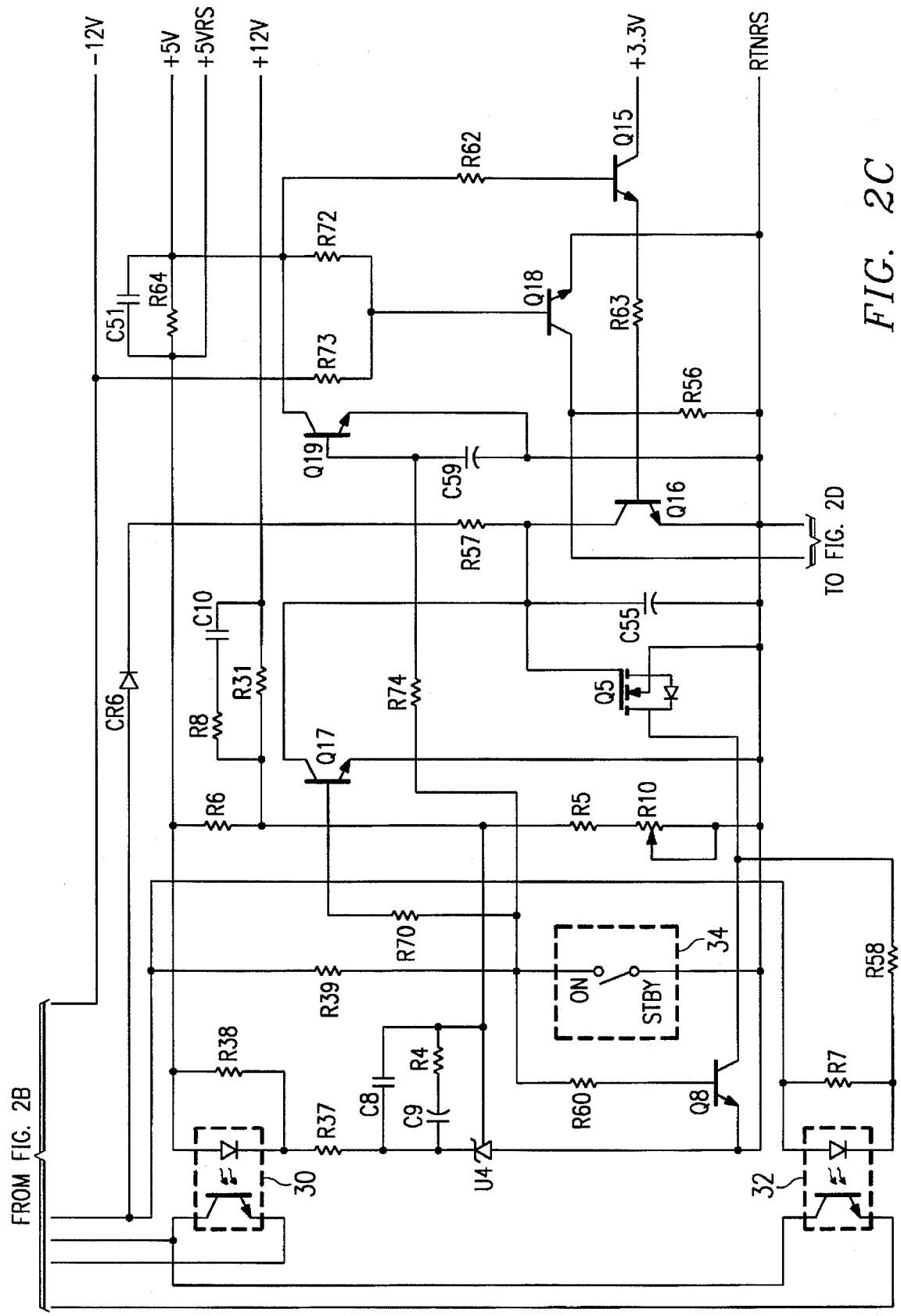
FIG. 2C is a circuit diagram of a third portion of the secondary side of the power supply of FIG. 1.

Turning first to FIG. 2C, the operation of the secondary side power switch 34 will now be described in greater detail. Presuming initially that the power supply 11 is in the ON mode, the PWM controller 26 is generating the pulse output along the OUT line 27 which couples the PWM controller 26 and the transformer switch 27. Each time the pulse output goes high, the transformer switch 28 closes to connect the AC input line 19 with the primary side of the isolation transformer 22. By connecting the AC input line 19 with the primary side of the isolation transformer 22, a charge develops on the charging capacitors provided on the secondary side of the isolation transformer 22. This charge is then used to provide DC power to the energy demanding components coupled to the various output lines. For example, charging capacitor C36 provides DC power to energy demanding components coupled to the +12 V output line, charging capacitors C37 and C38 provides DC power to energy demanding components coupled to the +5 V output line and charging capacitor C34 provides DC power to energy demanding components coupled to the +3.3 V output line.

Additionally, current will flow from the secondary side of the isolation transformer 22 towards the optical switch 32 via resistor R77 and rectifier diode CR20 (see FIG. 2A). However, since the secondary side power switch 34 is closed, transistor Q8, which is coupled between the rectifier diode CR20 and the optical switch 32, is shorted out. With the transistor Q8 shorted out, no current may flow through its collector. As a result thereof, the transmitter of the optical switch 32, which is coupled between the secondary side of the isolation transformer 22 and the collector of the transistor Q8, is prevented from having current flow through the transmitter. The LED remains dark and the receiver of the optical switch 32 will not detect any signal from the receiver.

When the LED is dark, no signal is received by the receiver of the optical switch 32. Accordingly, the COMP input (see FIG. 2A) to the PWM controller 26 is unaffected and the PWM controller 26 will continue to generate the PULSE output at its OUT line 27 which, as previously described, causes the transformer switch 28 to couple the AC input line 19 to the primary side of the isolation transformer 22 such that the energy demanding components 14, 16 are powered by the DC output line 21.

As previously set forth, the secondary side power switch 34 is movable between a closed position (during which the power supply 11 is ON) and an open position (during which the power supply 11 is in STANDBY mode). To switch the power supply 11 from the ON mode into the STANDBY mode, the secondary side power switch 34 is moved from the closed position to the open position. Resistor R39, which is coupled between the rectifier diode CR20 and secondary side power switch 34, is pulled up. In turn, resistor R60, which is coupled between the secondary side of the isolation transformer 22 and the base of the transistor Q8 is charged, thereby causing current to flow through the collector of the transistor Q8 and through the transmitter of the optical switch 32, thereby causing the LED to illuminate.

Illumination of the LED is detected by the receiver of the optical switch 32. The receiver of the optical switch 32 pulls the COMP input of the PWM controller 26 low. In response to the COMP input going low, the PWM controller 26 changes the pulse sequence generated at OUT line 27 from the pulse output to the spike output. While the spike output still allows the transfer of current to the secondary side of the isolation transformer 22, the reduced duration and frequency during which such transfers occur substantially reduce the charge which accumulates on the secondary side. Specifically, insufficient charge will be stored by the charging capacitors C34, C36, C37 and C38 for the energy demanding components to power the energy demanding components 14, 16 thereby causing the energy demanding components 14, 16 to power down.

To maintain the LED signal which causes the PWM controller 26 to generate the SPIKE output which holds the power supply 11 in the STANDBY mode, a separate charging circuit which powers the optical switch 32 when the power supply 11 is in STANDBY mode and no voltage is available along the DC output lines. Specifically, resistor R77, and capacitor C40 are coupled between the isolation transformer 22 and the optical switch 32. These components are selected, relative to the charging capacitors C34, C36, C37 and C38 such that the capacitor C40 will accumulate sufficient charge to power the optical switch 32 during the relatively short periods of time that the SPIKE output permits the isolation transformer 22 to be coupled to the AC input line 19. For example, a 10 μF capacitor may be selected as the capacitor C40 while a 1000 μF capacitor is selected as the charging capacitor C36 and 4700 μF capacitors are selected as the charging capacitors C34, C37 and C38. Thus, the power supply 11 consumes on the order of about 0.5 Watt in STANDBY mode. In contrast, the power supply 11 consumes on the order of about 300 Watts in the ON mode.

To return the power supply 11 to the ON mode, the secondary side power switch is closed to again short the transistor Q8 to prevent current flow through the transmitter of the optical switch 32. The LED would again go dark, causing the output of the PWM controller to return to the PULSE output.

Continuing to refer to FIG. 2C, further details regarding the operation of the optical reference voltage regulator 30 will now be provided. As previously stated, the transmitter of the optical reference voltage regulator 30 continuously generates an optical signal of varying intensity to the optical receiver. The transmitted signal is directly related to the voltage level on the +5 V and +12 V output lines. To provide this information, adjustable voltage reference U4 is connected between the optical reference voltage regulator 30 and the RTNRS line with its input coupled to both the 5 V line (via resistor R6 and the 12 V line (via resistor R31). If either the line voltage being supplied to the primary side of the isolation transformer 22 decreases or the load drawing down the secondary side of the isolation transformer 22 increases, the voltage on the output lines will decrease. Conversely, if either the line voltage to the primary side of the isolation transformer 22 increases or the load drawing down the secondary side of the isolation transformer 22 decreases, the voltage on the output lines will increase. As the amount of current transmitted by U4 will vary proportionally with a fluctuation on either the +5 V or +12 V lines, the current flowing through the transmitter of the optical reference voltage regulator 30, as well as the intensity of the light beam generated thereby, will correspondingly fluctuate.

The receiver of the optical reference voltage regulator 30 is coupled to the COMP input of the PWM controller 26. In response to either an increase or decrease in the COMP input, the PWM controller will respectively shorten or lengthen the PULSE output generated at the OUT line 27, thereby adjusting the DC output line voltage in the manner previously described.

Continuing to refer to FIG. 2C, a protection circuit incorporated into the secondary side of the power supply 11 will now be described in greater detail. While the aforementioned circuit is used to protect the power supply 11 from damage due to a short circuit occurring between an output voltage line and ground by automatically switching the power supply 11 from the ON mode to the STANDBY mode, it should be noted that the aforementioned protection circuit also works in conjunction with other protection circuits such as fan protection circuit 36 and overvoltage protection circuit 38, both of which are later described in greater detail, to protect the power supply from a variety of hazardous conditions.

During normal operations, the power supply 11 is in the ON mode and the secondary side power switch 34 is in the closed position. By closing the power switch 34, the base of transistors Q8 and Q17 are shorted to ground. As normal voltage levels are being provided to the +5 V and +3.3 V output lines, the transistor Q15 and Q16 are both on, thereby shorting the capacitor C55. As the capacitor C55 is shorted, the transistor Q5 and the optical switch 32 are off.

If a short circuit between either the +3.3 V, 12 V or +5 V output lines and ground occurs, the transistor Q15 will lose either its collector current (if the short is on the +3.3 V output line) or its base current (if the short is on the +5 V or +12 V output line). By turning the transistor Q15 off, current will no longer run through the R63/R56 divider circuit, thereby turning the transistor Q16 off and removing the short circuit which previously prevented the capacitor C55 from charging. When charged, the capacitor C55 will turn the transistor Q5 on. As the transistor Q5 is coupled to the optical switch 32, the transistor Q5 turns the optical switch 32 on, thereby automatically switching the power supply 11 into the STANDBY mode in the manner previously described until the secondary side power switch 34 is transitioned from the ON state to the STANDBY state, thus turning on the transistor Q17 on which shorts the capacitor C55, and returned to the ON state, thereby permitting the transistors Q15 and Q16 to turn on, holding the transistor Q5 off, thereby turning the optical switch 32 off to return the power supply 11 to the ON mode.

Figure 2D:
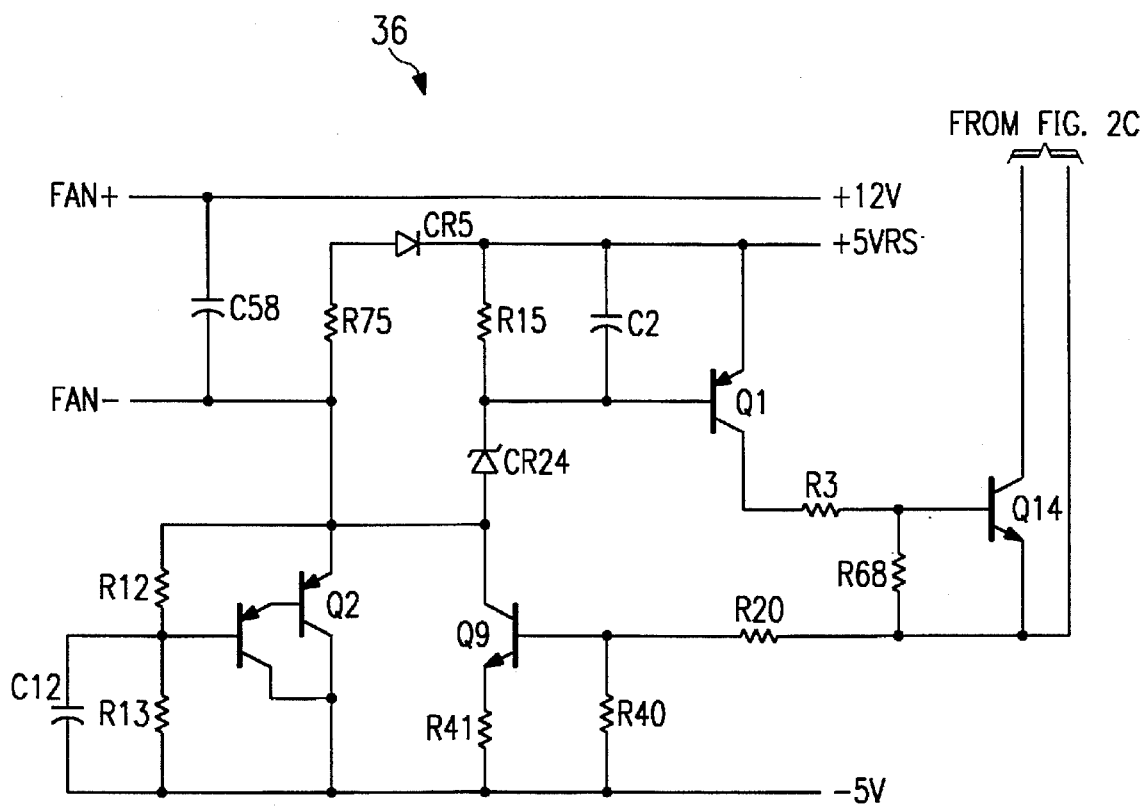
FIG. 2D is a circuit diagram of a fourth portion of the secondary side of the power supply of FIG. 1 which includes a fan control circuit for the power supply.

Referring next to FIG. 2D, a fan protection circuit 36 provided as a part of the power supply 11 will now be described in greater detail. As may now be seen, power is supplied to the FAN+ and FAN− lines from the +12 V and +5 VRS lines of the power supply 11. Also connected to the +12 V and +5 VRS lines is the fan protection circuit 36. The fan protection circuit 36 protects the fan motor from damage resulting from emergency overvoltage conditions, for example, if the rotor blades of the fan became jammed.

Centrally involved with the operation of the fan protection circuit 36 are transistors Q1 and Q14. Transistor Q1 includes an emitter connected to the +5 VRS line, a base connected to the junction of resistor R15, capacitor C2 and zener diode CR24 and a collector connected to the base of transistor Q14. If the rotor blade of the fan becomes blocked, the resultant rise of voltage along the +5 VRS line turns the transistor Q1 on. In turn, the current which begins to flow from the transistor Q1 turns the transistor Q14 on.

Returning momentarily to FIG. 2C, the emitter of the transistor Q14 is connected to the return line RTNRS and the collector of the transistor Q14 is connected to the collector of the transistor Q18. When the transistor Q14 turns on, the base of the transistor Q16 collapses, thereby allowing the capacitor C55 to begin to charge. The charge on the capacitor C55 turns the transistor Q5 on. As the transistor Q5 is coupled to the optical switch 32, the transistor Q5 turns the optical switch 32 on. The optical switch 32 pulls the COMP input to PWM controller 26 low, thereby causing the PWM controller 26 to change the pulse sequence generated at the OUT line from the PULSE output to the SPIKE output. In this manner, an emergency overvoltage condition automatically causes the power supply to transition into the STANDBY mode. As before, the optical switch 32 will remain powered in the STANDBY mode until the secondary side power switch 34 is transitioned from the ON state to the STANDBY state and returned to the ON state, thereby permitting the transistors Q1, Q4 and Q5 to turn off, the transistor Q16 to turn on, and the transistor Q5 and the optical switch 32 to turn off. Additional details regarding the fan protection circuit 36 are set forth in co-pending U.S. patent application Ser. No. 08/076,466, pending, which is hereby incorporated by reference as if reproduced in its entirety.

Figure 2E:
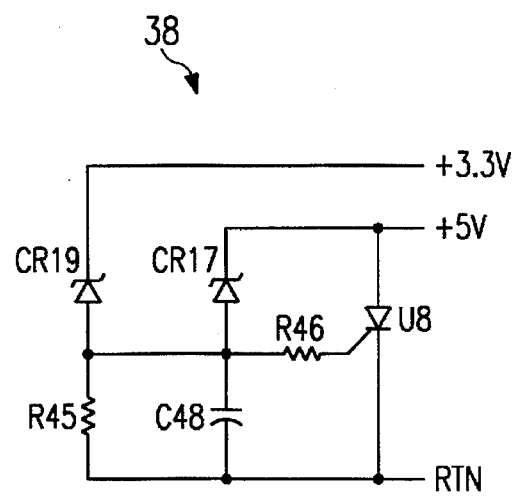
FIG. 2E is a circuit diagram of a fifth portion of the secondary side of the power supply of FIG. 1 which includes an overvoltage protection circuit portion for the power supply.

Referring next to FIG. 2E, an overvoltage protection circuit 38 also included as part of the power supply 11 will now be described in greater detail. The overvoltage circuit includes a first zener diode CR17 coupled between the 5 V and RTN lines, a second zener diode CR19 coupled between the 3.3 V and RTN lines and SCR U8 coupled between the 5 V and RTN lines. When an overvoltage condition arises, i.e., the output voltage on either of the 5 V or 3.3 V lines increase, the corresponding zener diode CR17 or CR19 begins to conduct, thereby turning on SCR U8 and creating a short circuit between the +5 V and RTN lines.

Again returning momentarily to FIG. 2C, the short between the +5 V and RTN lines causes the transistor Q15 to turn off. As the emitter of the transistor Q15 is tied to the base of the transistor Q16, the transistor Q16 also turns off. Further, as the capacitor C55 is connected between the collector and emitter of the transistor Q16, by turning off, the transistor Q16 permits the capacitor C55 to begin charging. The accumulated charge on the capacitor C55, turns on the transistor Q5 which, in turn, turns on the optical switch 32.

As before, the optical switch 32 pulls the COMP input to the PWM controller 26 low, thereby causing the PWM controller 26 to change the pulse sequence generated at the OUT line from the PULSE output to the SPIKE output. In this manner, an overvoltage condition automatically causes the power supply to transition into the STANDBY mode. As before, the optical switch 32 will remain powered in the STANDBY mode until the secondary side power switch 34 is transitioned from the ON state to the STANDBY state, and returned to the ON state, thereby permitting the transistors Q15 and Q16 to turn on, the transistor Q5 and the optical switch 32 to turn off.

Thus, there has been described and illustrated herein, a computer system and an associated power supply provided with a power switch placed on the secondary side thereof. By placing the power switch on the secondary side, the power switch no longer need comply with the various safety regulations relating to electrical components coupled to an AC input line. Thus, the need for a relatively expensive switch rated for high, i.e., 120 VAC voltage has been eliminated. In its place, an inexpensive, low voltage power switch may now be used. It should be clearly understood, however, that the foregoing detailed description is given by way of illustration and example only, the spirit and scope of the present invention being limited solely by the appended claims.

What is claimed is:

1. A power supply for a computer system having at least one energy demanding component requiring a first DC voltage for operation thereof, said power supply comprising:

an input line for coupling said power supply with an AC main;

an output line for coupling said power supply with said at least one energy demanding component of said computer system;

a transformer having a primary side coupled to said input line and a secondary side coupled to said output line;

a switching system having a power switch movable between first and second positions, an input coupled to said secondary side of said transformer and an output coupled to said primary side of said transformer, said switching system requiring a second DC voltage, lower than said first DC voltage, for operation thereof;

said output of said switching system intermittently connecting said primary side of said transformer to said input line at a first frequency when said power switch is in said first position and intermittently connecting said primary side of said transformer to said input line at a second frequency when said power switch is in said second position;

whereby said secondary side of said transformer provides sufficient DC voltage to operate said at least one energy demanding component of said computer system when said power switch is in said first position and said primary side of said transformer is intermittently connected to said input line at said first frequency and provides sufficient DC voltage to operate said switching system but insufficient DC voltage to operate said at least one energy demanding component of said computer system when said power switch is in said second position and said primary side of said transformer is intermittently connected to said input line at said second frequency.

2. A power supply according to claim 1, and further comprising:

a charging circuit coupled to said secondary side of said transformer, said switching system and said output line;

said charging circuit charging whenever said primary side of said transformer is connected to said input line;

said charging circuit having sufficient charge to operate said at least one energy demanding component of said computer system when said power switch is in said first position and having sufficient charge to operate said switching system but insufficient charge to operate said at least one energy demanding component of said computer system when said power switch is in said second position.

3. A power supply according to claim 2, wherein said switching system further comprises:

a first portion coupled to said primary side of said transformer;

a second portion coupled to said secondary side of said transformer;

said second portion of said switching system transmitting a signal to said first portion of said switching system in response to said power switch being moved between said first and second positions;

said first portion of said switching system intermittently connecting said primary side of said transformer to said input line at either said first frequency or said second frequency in response to said signal received from said second portion of said switching system.

4. A power supply according to claim 1, wherein said switching system further comprising:

an optical switch coupled to said secondary side of said transformer to receive said second DC voltage, said optical switch having an optical transmitter coupled to said power switch and an optical receiver; and a transformer switching circuit coupled to said optical receiver and said primary side of said transformer;

said optical transmitter transmitting a signal to said optical receiver in response to said power switch being moved between said first and second positions;

said transformer switching circuit intermittently connecting said primary side of said transformer with said input line at said first frequency if said signal indicates that said power switch has been moved from said second position to said first position and intermittently connecting said primary side of said transformer with said input line at said second frequency if said signal indicates that said power switch has been moved from said first position to said second position.

5. A power supply according to claim 4 wherein said transformer switching circuit further comprises:

a pulse width modulator having a first input coupled to an output of said optical receiver and an output; and a transformer switch having an input coupled to said output of said pulse width modulator;

said pulse width modulator selectively issuing, at its output, a pulse sequence which alternates between first and second states at either said first frequency or said second frequency;

said transformer switch selectively connecting or disconnecting said primary side of said transformer with said input line at each change between said first and second states.

6. A power supply according to claim 5 wherein said first state of said pulse sequence has a first duration when said pulse sequence alternates between said first and second states at said first frequency and a second duration when said pulse sequence alternates between said first and second states at said second frequency.

7. A power supply according to claim 6 wherein said first frequency is about 50 KHz and said second frequency is about 330 Hz.

8. A power supply according to claim 7 wherein said first duration is about 9 μsec when said first pulse sequence alternates at said first frequency and about 3.3 nanosecond when said first pulse sequence alternates at said second frequency.

9. A power supply for a computer having at least one energy demanding component requiring a first DC voltage for operation thereof, said power supply comprising:

an input line for coupling said power supply with an AC main;

an output line for coupling said power supply with said at least one energy demanding component;

a transformer having a primary side coupled to said input line and a secondary side coupled to said output line;

a charging circuit coupled between said secondary side of said transformer and said output line, said charging circuit charging whenever said primary side of said transformer is connected to said input line;

an optical switch having an optical transmitter and an optical receiver, said optical transmitter requiring a second DC voltage, lower than said first DC voltage, for operation thereof and coupled to said charging circuit to receive said second DC voltage;

a secondary side power switch coupled to said optical receiver and movable between first and second positions;

a pulse width modulator having a first input coupled to an output of said optical receiver and an output; and a transformer switch having an input coupled to said output of said pulse width modulator;

said optical transmitter transmitting a signal to said optical receiver in response to said power switch being moved between said first and second positions;

said pulse width modulator receiving said signal at said first input and selectively issuing, at its output, a pulse sequence which alternates between first and second states at said first frequency if said power switch is in said first position or at said second frequency if said power switch is in said second position;

said transformer switch selectively connecting or disconnecting said primary side of said transformer with said input line at each change between said first and second states;

whereby said secondary side of said transformer provides sufficient DC voltage to operate said at least one energy demanding component when said power switch is in said first position and provides sufficient DC voltage to operate said optical transmitter but insufficient DC voltage to operate said at least one energy demanding component when said power switch is in said second position.

10. A power supply according to claim 9 wherein said first state of said pulse sequence has a first duration when said pulse sequence alternates between said first and second states at said first frequency and a second duration when said pulse sequence alternates between said first and second states at said second frequency.

11. A power supply for a computer according to claim 10 and further comprising:

a voltage regulation system having a DC voltage measurement circuit coupled to said charging circuit, a second optical transmitter coupled to said voltage measurement circuit and a second optical receiver;

said pulse width modulator having a second input coupled to said second optical receiver;

said second optical transmitter issuing a level signal indicative of variance of a measured DC voltage from said first DC voltage;

said pulse width modulator adjusting said duration of said first state if said level signal indicates that said measured DC voltage has varied from said first DC voltage.

12. A personal computer, comprising:

a computer subsystem having at least one energy demanding device requiring a first DC voltage for operation thereof; and a power supply having an input line for coupling to an AC main and an output line coupled to said at least one energy demanding device, said power supply receiving, at said input line, a high voltage AC power from said AC main and providing, at said output line, said first DC voltage to said at least one energy demanding device;

said power supply further comprising:

a transformer having a primary side coupled to said input line and a secondary side coupled to said output line;

a switching system having a power switch movable between first and second positions, an input coupled to said secondary side of said transformer and an output coupled to said primary side of said transformer, said switching system requiring a second DC voltage, lower than said first DC voltage, for operation thereof;

said output of said switching system intermittently connecting said primary side of said transformer to said input line at a first frequency when said power switch is in said first position and intermittently connecting said primary side of said transformer to said input line at a second frequency when said power switch is in said second position;

whereby said secondary side of said transformer provides sufficient DC voltage to operate said at least one energy demanding component when said power switch is in said first position and provides sufficient DC voltage to operate said switching system but insufficient DC voltage to operate said at least one energy demanding component when said power switch is in said second position.

13. A personal computer according to claim 12, wherein said power supply further comprises:

a charging circuit coupled to said secondary side of said transformer, said switching system and said output line;

said charging circuit charging whenever said primary side of said transformer is connected to said input line;

said charging circuit having sufficient charge to operate said at least one energy demanding component when said power switch is in said first position and having sufficient charge to operate said switching system but insufficient charge to operate said at least one energy demanding device when said power switch is in said second position.

14. A personal computer according to claim 12 wherein said switching system further comprises:

a first portion coupled to said primary side of said transformer;

a second portion coupled to said secondary side of said transformer;

said second portion of said switching system transmitting a signal to said first portion of said switching system in response to said power switch being moved between said first and second positions;

said first portion of said switching system intermittently connecting said primary side of said transformer to said input line at either said first preselected frequency or said second preselected frequency in response to said signal received from said second portion of said switching system.

15. A personal computer according to claim 12, wherein said power supply further comprises:

an optical switch coupled to said charging circuit to receive DC voltage for operation thereof, said optical switch having an optical transmitter coupled to said power switch and an optical receiver; and a transformer switching circuit coupled to said optical receiver and said primary side of said transformer;

said optical transmitter transmitting a signal to said optical receiver in response to said power switch being moved between said first and second positions;

said transformer switching circuit intermittently connecting said primary side of said transformer with said input line at said first preselected frequency if said signal indicates that said power switch has been moved from said second position to said first position and intermittently connecting said primary side of said transformer with said input line at said second preselected frequency if said signal indicates that said power switch has been moved from said first position to said second position.

16. A personal computer according to claim 15 wherein said transformer switching circuit further comprises:

a pulse width modulator having a first input coupled to an output of said optical receiver and an output; and a transformer switch having an input coupled to said output of said pulse width modulator;

said pulse width modulator selectively issuing, at its output, a pulse sequence which alternates between first and second states at either said first preselected frequency or said second preselected frequency;

said transformer switch selectively connecting or disconnecting said primary side of said transformer with said input line at each change between said first and second states.

17. A personal computer according to claim 16 wherein said first state of said pulse sequence has a first duration when said pulse sequence alternates between said first and second states at said first frequency and a second duration when said pulse sequence alternates between said first and second states at said second frequency.

18. A personal computer according to claim 10, and further comprising:

a voltage regulation system having a DC voltage measurement circuit coupled to said charging circuit, a second optical transmitter coupled to said voltage measurement circuit and a second optical receiver;

said pulse width modulator having a second input coupled to said second optical receiver;

said second optical transmitter issuing a level signal indicative of variance of a measured DC voltage from said first DC voltage;

said pulse width modulator adjusting said duration of said first state if said level signal indicates that said measured DC voltage has varied from said first DC voltage.

19. A power supply for a computer having at least one energy demanding component, said power supply comprising:

a rectifier connected to receive an AC voltage and provide rectified power and ground voltages therefrom;

a transformer having a primary winding and a secondary winding which is inductively coupled to said primary winding;

a switching transistor operatively connected to said primary winding and to one of said rectified voltages, to switchably drive said primary winding;

a control circuit connected to drive said switching transistor selectably in first and second selectable modes of operation;

a switch which is operatively connected, through a first optical isolation element, to select said first or second mode of operation of said control circuit; said first optical isolation element having a transmitter side which is powered from said secondary winding of said transformer, and not from said primary winding of said transformer; said switch not being powered from said primary winding of said transformer;

a feedback circuit connected, through a second optical isolation element, to provide an error signal to said control circuit; wherein said control circuit, in said first mode, varies the operation of said switching transistor in accordance with said error signal;

wherein in said first mode, but not in said second mode, said switching transistor is driven so that said transformer transfers sufficient power to operate said energy demanding component; and wherein, in said second mode, said switching transistor is driven so that said transformer transfers sufficient power to operate said first optical isolation element, but not to power said energy demanding component.

20. The power supply of claim 19, wherein said control circuit comprises a pulse width modulator.

21. The power supply of claim 19, wherein said control circuit comprises a pulse width modulator which selectively issues, at an output thereof, a pulse sequence which alternates between first and second states at a first frequency in said first mode, and at a second frequency which is different from said first frequency in said second mode.

22. The power supply of claim 21, wherein said first frequency is about 50 KHz and said second frequency is about 330 Hz.

23. The power supply of claim 19, wherein said control circuit comprises a pulse width modulator which selectively issues, at an output thereof, a pulse sequence which alternates between first and second states at a first frequency in said first mode, and at a second frequency which is different from said first frequency in said second mode; wherein said first state of said pulse sequence has a first duration when said pulse sequence alternates between said first and second states at said first frequency and a second duration when said pulse sequence alternates between said first and second states at said second frequency.

24. The power supply of claim 23, wherein said first duration is about 9 μsec when said first pulse sequence alternates at said first frequency and about 3.3 nanosecond when said first pulse sequence alternates at said second frequency.

25. The power supply of claim 23, wherein said first frequency is about 50 KHz and said second frequency is about 330 Hz.

26. The power supply of claim 19, further comprising a charging circuit coupled to said secondary winding of said transformer to be charged thereby.

27. A personal computer, comprising: a computer subsystem having at least one energy demanding component; and a power supply having an input line for coupling to an AC main and an output line coupled to said at least one energy demanding component, said power supply receiving, at said input line, a high voltage AC power from said AC main and providing, at said output line, a first DC voltage to said energy demanding component; said power supply further comprising:

a transformer having a primary winding and a secondary winding which is inductively coupled to said primary winding;

a switching transistor operatively connected to said primary winding and to one of said rectified voltages, to switchably drive said primary winding;

a control circuit connected to drive said switching transistor selectably in first and second selectable modes of operation;

a switch which is operatively connected, through a first optical isolation element, to select said first or second mode of operation of said control circuit; said first optical isolation element having a transmitter side which is powered from said secondary winding of said transformer, and not from said primary winding of said transformer; said switch not being powered from said primary winding of said transformer; and a feedback circuit connected, through a second optical isolation element, to provide an error signal to said control circuit; wherein said control circuit, in said first mode, varies the operation of said switching transistor in accordance with said error signal;

wherein in said first mode, but not in said second mode, said switching transistor is driven so that said transformer transfers sufficient power to operate said energy demanding component; and wherein, in said second mode, said switching transistor is driven so that said transformer transfers sufficient power to operate said first optical isolation element, but not to power said energy demanding component.

28. The computer of claim 27, wherein said control circuit comprises a pulse width modulator.

29. The computer of claim 27, wherein said control circuit comprises a pulse width modulator which selectively issues, at an output thereof, a pulse sequence which alternates between first and second states at a first frequency in said first mode, and at a second frequency which is different from said first frequency in said second mode.

30. The computer of claim 29, wherein said first frequency is about 50 KHz and said second frequency is about 330 Hz.

31. The computer of claim 27, wherein said control circuit comprises a pulse width modulator which selectively issues, at an output thereof, a pulse sequence which alternates between first and second states at a first frequency in said first mode, and at a second frequency which is different from said first frequency in said second mode; wherein said first state of said pulse sequence has a first duration when said pulse sequence alternates between said first and second states at said first frequency and a second duration when said pulse sequence alternates between said first and second states at said second frequency.

32. The computer of claim 31, wherein said first duration is about 9 μsec when said first pulse sequence alternates at said first frequency and about 3.3 nanosecond when said first pulse sequence alternates at said second frequency.

33. The computer of claim 31, wherein said first frequency is about 50 KHz and said second frequency is about 330 Hz.

34. The computer of claim 27, further comprising a charging circuit coupled to said secondary winding of said transformer to be charged thereby.

* * * * *